United States Patent [19]
Taylor et al.

[11] Patent Number: 4,725,068
[45] Date of Patent: Feb. 16, 1988

[54] CONVERTIBLE TOWING HITCH

[75] Inventors: Chauncey D. Taylor; David S. Taylor, both of Morgan, Ga.

[73] Assignee: Hydrapak Corporation, Morgan, Ga.

[21] Appl. No.: 25,129

[22] Filed: Mar. 12, 1987

[51] Int. Cl.4 .............................................. B60D 1/00
[52] U.S. Cl. .............................. 280/415 A; 280/492; 280/494; 172/248; 172/677
[58] Field of Search ............... 280/492, 493, 494, 495, 280/498, 491 E, 456 R, 461 R, 415 R, 415 A, 474, 504, 411 A, 473; 172/248, 677, 776, 313

[56] References Cited

U.S. PATENT DOCUMENTS

| | | | |
|---|---|---|---|
| 1,934,141 | 11/1933 | Prentice | 280/492 |
| 2,027,499 | 1/1936 | Tully | 280/492 |
| 2,937,886 | 5/1960 | Poole | 280/492 |
| 3,680,892 | 8/1972 | Olthoff et al. | 280/492 |
| 3,730,557 | 5/1973 | Cox | 280/504 |
| 3,951,435 | 4/1976 | Greatbach | 280/492 |
| 4,015,549 | 4/1977 | Brown, Jr. | 280/423 B |
| 4,433,853 | 2/1984 | Swaim | 280/415 R |

FOREIGN PATENT DOCUMENTS

| | | | |
|---|---|---|---|
| 100597 | 4/1937 | Australia | 280/492 |
| 254572 | 4/1963 | Australia | 280/492 |

*Primary Examiner*—John J. Love
*Assistant Examiner*—Everett G. Diederiks, Jr.
*Attorney, Agent, or Firm*—Larson and Taylor

[57] ABSTRACT

A convertible towing hitch which is used to tow a farm implement with a vehicle includes a U-shaped planar member. This planar member has a central connecting leg, a first extending leg, and a second extending leg. A two-way pivot alowing two degrees of rotational freedom is attached at a free end of the first extending leg and to the implement. The two-way pivot allows pivoting an axis perpendicular to the plane of the U-shaped ember and about an axis parallel to the first, extending leg. An attachment device is also provided for removabley attaching the U-shaped to a bar pulled by the vehicle. The attachment device is mounted for rotational movement about an axis parallel to the connecting leg at a free end of the second extending leg. Preferably, the attachment device is located in the open area of the U-shaped member and an extension is provded of the connected leg extendng away from the second extending leg. At the end of the extension, a second attachment device is provided for removably attaching the U-shaped member to a second vehicle. When attached to the second vehicle, the elements of the farm implement are raised-while in the position where the first-mentioned attachment device is used, the work implements are lowered. A flange on the first extending leg is further provided to lock the two-way pivot against rotation about the axis perpendicular to the plane of the U-shaped member when the towing hitch is used in the raised position.

6 Claims, 2 Drawing Figures

U.S. Patent   Feb. 16, 1988   4,725,068

CONVERTIBLE TOWING HITCH

FIELD OF THE INVENTION

The present invention relates generally to a towing hitch which is used to tow a work implement with a vehicle, and more particularly to a convertible planar towing hitch which is usable to tow a work implement with a first vehicle having a first attachment mechanism as well as with a second vehicle having a second attachment mechanism.

BACKGROUND OF THE INVENTION

In U.S. Pat. No. 3,951,435 (Greatbach), a vehicle coupling is provided which include two members for coupling a tractor to a trailer. One member comprises an A-frame which is pivotally attached about a horizontal transverse axis to the tractor. This A-frame member is further pivotally attached to the trailer through a two degree rotational coupling which allows rotation about a horizontal longitudinal axis and a vertical axis.

Various universal type trailer hitches have also been disclosed in the prior art. Examples of such hitches include these shown in the following U.S. Pat. Nos. 1,934,141 (Prentice); 2,027,499 (Tully); 3,730,557 (Cox); and 3,680,892 (Olthoff et al).

Another towing connection which provides three degrees of movement is disclosed in U.S. Pat. No. 2,937,886 (Poole). This towing connection includes a bifurcated beam which is connected to a tractor at the two ends thereof for rotation about a horizontal transverse axis. The other end of the bifurcated beam is mounted for rotation about a horizontal longitudinal axis in a yoke. Extending upwardly from the yoke is a vertical axle about which a goose necked tow bar for a trailer is coaxially received.

Disclosed in U.S. Pat. No. 4,433,853 (Swaim) is a convertible trailer hitch for towing a trailer or the like. The hitch includes a goose neck arm braced by an A-frame tongue. The goose neck arm can be used for towing, or the goose neck arm can be pivoted out of the way and locked into position and the A-frame tongue used for towing. Another adjustable goose neck towing hitch is disclosed in U.S. Pat. No. 4,015,549 (Brown, Jr.), where an upstanding landing leg is provided adjacent the towed implement.

SUMMARY OF THE INVENTION

In accordance with the present invention, a convertible planar towing hitch is provided which is used to tow a work implement with a vehicle. The towing hitch includes a U-shaped planar member having a central connecting leg, a first extending leg and a second extending leg. A central open area is thus provided between the first and second extending legs. A two-way pivot means having two attachment ends is attached to the free end of the first extending leg. This pivot means allows two degrees of rotational freedom between the attachment ends, namely pivoting about an axis perpendicular to the plane of the U-shaped member and about an axis parallel to the first extending leg. One of the attachment ends is attached to the free end of the first extending leg and the other attachment end is attached to the implement. An attachment mean is also provided for removably attaching the U-shaped member to a bar extending from the towing vehicle such as a bottom plow. This attaching means includes a mounting means for rotationally mounting the attachment means adjacent the free end of the second extending leg for rotation about an axis parallel to the connecting leg.

In the preferred embodiment of the present invention, the attachment means is located in the open area of the U-shaped member. In addition, an extension having a free end is also provided which extends the connecting leg away from the second extending leg. A second attachment means is located at the free end of the extension. This second attaching means is used for removably attaching the U-shaped member to a mounting on a second vehicle. Thus, the towing hitch of the present invention is selectively usable with the first mentioned vehicle such as a tractor mounted implement and with a second vehicle such a pickup truck which is used to deliver the implement to the tractor.

In the preferred embodiment, the attachment means is attached to the second vehicle such that the connecting leg is vertical and the extension is lowermost. Thus, the two-way pivot means is uppermost and the end of the implement such as a farming device attached thereto is uppermost as well. In this position, the working elements of such a farm implement are raised up out of contact with the surface over which the implement moves. A locking means is preferably provided for locking the two-way pivot means against rotation about the axis perpendicular to the plane of the U-shaped member in this position. On the other hand, when the towing hitch is attached to the bar of a tractor implement or the like, the connecting member is horizontal and uppermost, and the working elements of the farm implement can then engage the surface.

In this preferred embodiment, the locking means includes a flange extending from the free end of the first extending leg and having an aperture therein. The two-way pivot means includes a pin which forms the axis parallel to the first extending leg. This pin is selectively receivable in the aperture upon appropriate movement of the two-way pivot means about the other axis.

It is an object of the present invention to provide a towing hitch which can be used with a pickup truck or the like to tow a farming implement or the like with the working elements of the implement out of contact with the surface. When turning at the end of a row, the rear of the implement is selectively raised by means of a hydraulic cylinder to cause wheels to engage the ground and lift the work implement away from the ground.

It is also an object of the present invention to provide a towing hitch which is suitably attached to a tractor or bottom plow or the like such that the working elements of the implement are in contact with the surface.

It is a further object of the present invention to provide a towing hitch which is simply convertible from one mode of operation to the other as described above.

Still another object of the present invention is to provide a towing hitch which is attached to a bar extending from a tractor or bottom plow such that the bar is rotatable 180° about the horizontal longitudinal axis of the tractor or bottom plow while attached to the towing hitch, as typically occurs when positioning a reversible bottom plow to work the soil to the right in one position or to the left in the opposite position.

Other features and objects of the present invention are stated in or apparent from a detailed description of a presently preferred embodiment of the invention found hereinbelow.

DETAILED DESCRIPTION OF THE PREFERRED EMBODIMENT

Figure 1:
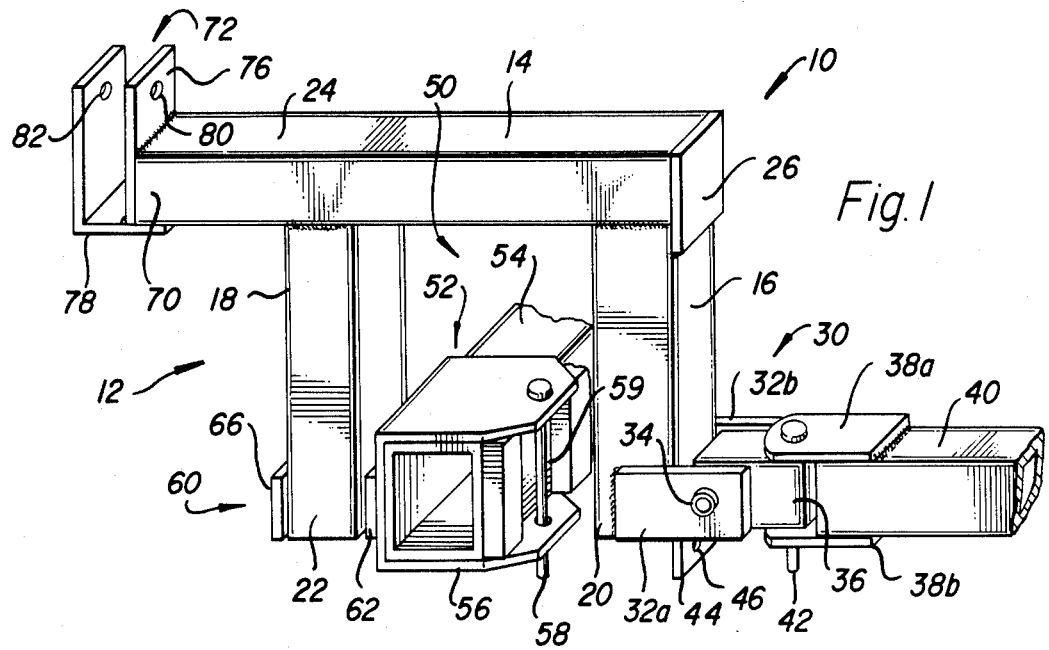
FIG. 1 is a side perspective view of a convertible towing hitch according to the present invention in a first position.
Figure 2:
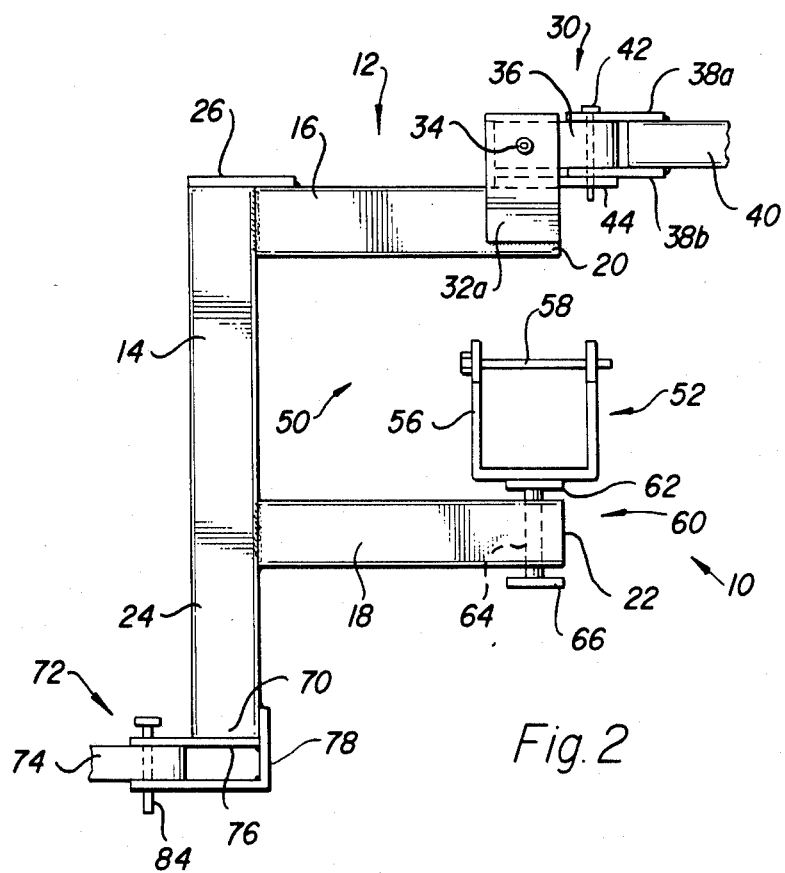
FIG. 2 is a side elevation view of the towing hitch depicted in FIG. 1 in a second position.

With reference now to the drawings in which like numerals represent like elements throughout the two views, a convertible towing hitch 10 is depicted in both FIGS. 1 and 2. Towing hitch 10 includes a generally U-shaped planar member 12. U-shaped member 12 is formed from a central connecting leg 14, a first extending leg 16, and a second extending leg 18. Extending legs 16 and 18 have respective free ends 20 and 22. As shown, connecting leg 14 includes an extension 24 which extends beyond second extending leg 18. Preferably, extending legs 16 and 18 are formed from steel beams which are welded to connecting leg 14. For increased strength, and to cover the open end of connecting leg 14 which is preferably formed from a square steel beam, a reinforcing plate 26 is welded around the periphery thereof to connecting leg 14 and to first extending leg 16.

Attached to free end 20 of first extending leg 16 is a two-way pivot means 30. Two-way pivot means 30 includes a pair of flanges 32a and 32b which are welded to opposite sides of free end 20 and which extend away from second extending leg 18 as shown. Flanges 32a and 32b include an aperture therein through which a pin 34 extends. Pin 34 is removably held in place on flanges 32a and 32b by use of a cotter pin or the like. Pin 34 passes through an aperture provided in a bearing block 36 located between flanges 32a and 32b. The aperture in block 36 is sized so that block 36 is freely rotatable about pin 34 and hence about an axis perpendicular to the plane of U-shaped member 12.

Two-way pivot means 30 also includes two flanges 38a and 38b which are provided on opposite sides of a towing bar 40 of a farm implement or the like. Flanges 38a and 38b extend away from towing bar 40 and include an aperture therein through which a pin 42 extends. Block 36 extends between flanges 38a and 38b and includes a aperture therein through which pin 42 extends. Thus, towing bar 40 is pivotally mounted relative to U-shaped member 12 for rotation about pin 42. This rotation about pin 42 is thus about an axis which is parallel to first extending leg 16. The apertures in block 36 and flanges 38a and 38b through which pin 42 extends are sized so that pin 42 is freely movable into and out of these apertures. Pin 42 is maintained in place in towing hitch 10 by gravity, although a cotter pin or the like may also be used if desired.

A flange 44 is suitably attached to free end 20 of first extending leg 16 so as to extend away from connecting leg 14. Flange 44 includes an aperture 46. As shown in FIG. 2, aperture 46 is located in flange 44 such that pin 42 is extendible therethrough after block 36 is rotated sufficiently about pin 34. The purpose of flange 44 is explained subsequently.

Located between first extending leg 16 and second extending leg 18 of U-shaped member 12 is an open area 50. Provided in open area 50 is an attachment means 52 for removably attaching U-shaped member 12 to a bar 54 which extends transversely from a tractor, tractor towed device, bottom plow or the like. Attachment means 52 includes a C-shaped member 56 having an aperture at the outer ends thereof through which a pin 58 is passed. As will be appreciated by those of ordinary skill in the art, pin 58 traps a reduced portion 59 of bar 54 in C-shaped member 56.

C-shaped member 56 is attached to free end 22 of second extending leg 18 by a suitable mounting means 60. Mounting means 60 includes a bearing plate 62 which is suitably attached as by welding to C-shaped member 56 as shown. Extending from bearing plate 62 is a rod 64 which passes through an aperture provided in free end 32. On the other end of rod 64 extending away from second extending leg 18, a bearing plate 66 is securely attached. The apertures in second extending leg 18 through which rod 64 extends are sufficiently sized and greased to allow free movement of rod 64 therein. Thus, C-shaped member 56 is rotatably mounted to second extending leg 18 for rotation about an axis which is parallel to the longitudinal axis of connecting member 14. The connecting member 14 can therefore be operated with a towing implement such as bottom plow in either a right hand or left hand working position.

Extension 24 includes a free end 70. Attached to free end 70 is a second attachment means 72 for attachment to a tongue 74 or the like typically extending from the rear of a pickup truck and having a vertical aperture therein. As shown, attachment means 72 includes a plate 76 attached at free end 70 extending parallel to and away from second extending leg 18. A right angle plate 78 is also attached to free end 70 such that a portion extends parallel to plate 76. Apertures 80 and 82 are respectively provided in plates 76 and 78 through which a pin 84 is received in order to hold tongue 74 between plates 76 and 78.

In operation, towing hitch 10 functions in the following manner. As depicted in FIG. 1, towing hitch 10 is attached to bar 54 of a tractor or the like in order for the tractor to pull a farm implement which is attached to towing bar 40. It should be appreciated that bar 54 pulls towing bar 40 to the left as depicted in FIG. 1 so that the force of towing exerted by bar 54 is against second extending arm 18 connecting through bearing plate 62. As bar 54 is moved by the tractor or the like, towing hitch 10 provides a three degree or three directions of freedom movement between bar 54 and towing bar 40 of the implement. These three degrees of movement are provided by two-way pivot means 30 which provides rotation about pins 42 and 34, and by mounting means 60 which provides a third degree of movement about rod 64.

It should be appreciated that bar 54 and towing bar 40 are located at approximately the same height by use of towing hitch 10. Thus, the working elements of the farm implement are designed to engage the ground underneath when towing bar 40 is towed at this height.

It should also be appreciated that bar 54 may be attached to a bottom plow which is in turn attached to the tractor. In such a situation, the bottom plow including bar 54 are rotated 180° about the horizontal longitudinal axis of the tractor in order to move the bottom plow from a right hand use position to a left hand use position. The provision of attachment means 52 in open area 50 of U-shaped member 12 allows this 180° movement of the bottom plow without disconnecting bar 54 from attachment means 52. Thus, when it is desired to rotate the bottom plow and hence bar 54 180°, attachment means 52 merely rotates around rod 64 as this turning movement occurs. This turning movement is allowed so long as bar 54 does not extend beyond attachment means 52 too far so as to hit connecting leg 14 at the 90° point in the turn. However, the size of open space 50 (or the length of extending leg 16 and 18) is easily chosen to accommodate whatever amount (if any) of bar 54 extends beyond attachment means 52. During the movement, towing hitch 10 is also raised vertically. However, this does not affect the implement being towed due to two way pivot means 30 which easily accommodates such a raising and lowering of towing hitch 10. Also, the towing implement can be turned around sharply at the end of the field with the implement being towed easily following behind.

The operation of towing hitch 10 in the second position is depicted in FIG. 2. In this position, it is desired to tow the farm implement so that the work elements of the farm implement are raised above the surface. Such an occasion typically arises when the farm implement is being transferred over a road or the like by a pickup truck. Typically, the pickup truck or the like has a tongue 74 which accepts a typical attachment means 72 a shown.

From the position depicted in FIG. 1, towing hitch 10 is simply rotated 90° about pin 34 (during this sequence, bar 54 is not present) to bring towing hitch 10 to the position depicted in FIG. 2. Near the end of the rotation of towing hitch 10, pin 42 is raised slightly in order to clear flange 44. After the rotation is finished, pin 42 is inserted in aperture 46 of flange 44. This prevents further rotation of U-shaped member 12 about pin 34 relative to towing bar 40. It is then a simple matter to move plates 76 and 78 over tongue 74 and insert pin 84 therethrough to lock towing hitch 10 to the pickup truck or the like.

In the position depicted in FIG. 2, it should be appreciated that towing bar 40 is raised the full height of connecting leg 14 and extension 24 in order to raise the work elements of the farm implement off of the ground. Obviously, the lengths of connecting leg 14 and extension 24 are designed to be sufficient for this purpose, and may be variable for different farm implements.

During towing in this position, rotation is allowed about pin 42, so that turning of the pickup truck and farm implement is not impeded. After delivery, pin 84 is removed and towing hitch 10 then acts as a stand for the farm implement until it is ready to be attached to the tractor (or bottom plow). When attachment is desired, pin 42 is removed sufficiently from aperture 46 and flange 44 to allow the rotation of U-shaped member 12 back to position depicted in FIG. 1. Then, pin 58 is removed and bar 54 inserted therein.

Although the present invention has been described with respect to an exemplary embodiment thereof, it will be understood by those of ordinary skill in the art that variations and modifications can be effected within the scope and spirit of the invention.

We claim:

1. A convertible planar towing hitch which is used to tow a work implement with a vehicle comprising:
    a U-shaped planar member including a central connecting leg, a first extending leg having a free end, a second extending leg having a free end, and a central open area between said first and second extending legs;
    a two-way pivot means having two attachment ends including means for allowing two degrees of rotational freedom, one of said attachment ends being attached to the free end of said first extending leg and the other of said attachment ends being attached to the implement, said means for allowing two degrees of rotational freedom enabling pivoting of said two-way pivot means about an axis perpendicular to the plane of said U-shaped member and about an axis parallel to said first extending leg;
    an attachment means for removably attaching said U-shaped member to a bar pulled by the vehicle, said attachment means including a mounting means for rotationally mounting said attachment means adjacent the free end of said second extending leg for rotation about an axis parallel to said connecting leg.

2. A convertible towing hitch as claimed in claim 1 wherein said attachment means is located in the open area of said U-shaped member.

3. A convertible towing hitch as claimed in claim 2 and further including an extension having a free end which extends said connecting leg away from said second extending leg, and a second attachment means located at the free end of said extension for removably attaching said U-shaped member to a mounting on a second vehicle such that said towing hitch is selectively useable with the first-mentioned vehicle and the second vehicle.

4. A convertible towing hitch as claimed in claim 3 wherein said second attachment means is attached to the second vehicle such that said connecting leg is vertical and said extension is lowermost whereby said two-way pivot means is uppermost and the end of the implement attached thereto is uppermost as well.

5. A convertible towing hitch as claimed in claim 4 and further including a locking means for locking said two-way pivot means against rotation about the axis perpendicular to the plane of the U shaped member when said second attachment means is utilized.

6. A convertible towing hitch as claimed in claim 5 wherein said locking means includes a flange extending from the free end of said first extending leg and having an aperture therein, and wherein said two-way pivot means includes a pin which forms the axis parallel to said first extending leg, said pin being selectively receivable in said aperture.

* * * * *